US 12,255,942 B2

(12) United States Patent
Gidley et al.

(10) Patent No.: US 12,255,942 B2
(45) Date of Patent: Mar. 18, 2025

(54) METHOD AND SYSTEM FOR GENERATING MEDIA CONTENT

(71) Applicant: NAGRAVISION SARL, Cheseaux-sur-Lausanne (CH)

(72) Inventors: Benjamin Gidley, Cwmbran (GB); Elizabeth Mounfield, Cwmbran (GB)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 0 days.

(21) Appl. No.: 17/960,955

(22) Filed: Oct. 6, 2022

(65) Prior Publication Data

US 2023/0114327 A1   Apr. 13, 2023

Related U.S. Application Data

(60) Provisional application No. 63/253,717, filed on Oct. 8, 2021.

(51) Int. Cl.
*G06F 15/16* (2006.01)
*H04L 43/0852* (2022.01)
*H04L 65/75* (2022.01)
*H04L 65/80* (2022.01)

(52) U.S. Cl.
CPC .......... *H04L 65/75* (2022.05); *H04L 43/0852* (2013.01); *H04L 65/80* (2013.01)

(58) Field of Classification Search
CPC ...... H04L 65/75; H04L 43/0852; H04L 65/80
See application file for complete search history.

(56) References Cited

U.S. PATENT DOCUMENTS

| | | | |
|---|---|---|---|
| 6,353,174 B1* | 3/2002 | Schmidt | H04L 9/40 709/200 |
| 10,929,092 B1 | 2/2021 | Karroll et al. | |
| 2008/0304653 A1* | 12/2008 | Ghani | H04M 9/08 379/406.08 |
| 2010/0215165 A1* | 8/2010 | Smaak | H04R 27/00 379/202.01 |
| 2012/0050456 A1 | 3/2012 | Arnao | |
| 2015/0304418 A1* | 10/2015 | Rajapakse | H04N 21/238 709/219 |
| 2020/0186575 A1* | 6/2020 | Rofe | H04L 65/765 |
| 2021/0365234 A1* | 11/2021 | Ur | G10L 21/0208 |
| 2023/0031866 A1* | 2/2023 | Hudson | H04L 65/80 |
| 2023/0353684 A1* | 11/2023 | Kim | H04M 9/10 |

FOREIGN PATENT DOCUMENTS

WO   WO 2019/038019 A1   2/2019

OTHER PUBLICATIONS

Extended European Search Report for Application No. 22200398.0 dated Jan. 15, 2023, 9 pages.

* cited by examiner

*Primary Examiner* — Duyen M Doan
(74) *Attorney, Agent, or Firm* — POLSINELLI LLP

(57) ABSTRACT

Systems and techniques are described herein for determining latencies between user devices, ordering or grouping the user devices according to those determined latencies, and then streaming audio to the user devices where the audio stream is played using speakers, and at the same time vocalizations of the user as they sing along to the received stream are captures, and combined with vocalizations of other users to create a final combined audio file.

18 Claims, 13 Drawing Sheets

All Users

| Client 1 | 0.025 |
|---|---|
| Client 2 | 0.375 |
| Client 3 | 0.555 |
| Client 4 | 0.010 |
| Client 5 | 0.651 |
| Client 6 | 1.300 |
| Client 7 | 0.666 |
| Client 8 | 0.435 |

Ordered Group

| Client 4 | 0.010 |
|---|---|
| Client 1 | 0.025 |
| Client 2 | 0.375 |
| Client 8 | 0.435 |
| Client 3 | 0.555 |
| Client 5 | 0.651 |
| Client 7 | 0.666 |
| Client 6 | 1.300 |

FIG. 11

METHOD AND SYSTEM FOR GENERATING MEDIA CONTENT

CROSS-REFERENCE TO RELATED APPLICATIONS

The present application claims the benefit of U.S. Provisional Application No. 63/253,717 filed Oct. 8, 2021, which is hereby incorporated by reference in its entirety and for all purposes.

FIELD

The present disclosure generally relates to capturing and synchronizing multiple users singing at remote locations while using an electronic conferencing application to generate media content.

BACKGROUND

Electronic conferencing technologies allow for the reception and transmission of audio and/or video signals by computing devices of different users in different locations. Most electronic conferencing applications work well when only a few users out of a group of users speak at the same time. However, electronic conferencing applications do not work very well when a large number of the users (e.g., all of the users) are trying to speak at the same time. For instance, such conferencing applications may not be optimized for cases where the users need to speak in synchronization (e.g., when singing). Different latencies for the different users are one source of the problem. For instance, the latency can be caused by Internet latency and/or computing device latency (e.g., latency involved in processing audio when recording and/or playing back content). Methods and systems are needed to compensate for the different latencies of different users, particularly where a number of users are speaking in synchronization (e.g., singing together).

SUMMARY

Techniques and systems are described herein for generating media content. In some examples, systems and techniques are described for determining latencies, and performing one or more functions based on the determined latencies.

According to at least one example, a method is provided for generating media content. The method includes: receiving, at a server, first audio data from a first device; sending the first audio data to a second device; receiving, at the server, first combined audio data, the first combined audio data representing second audio from a second device that is combined with the first audio data; sending the first combined audio data to a third device; and receiving, at the server, second combined audio data, the second combined audio data representing third audio from the third device that is combined with the first combined audio data.

In another example, a system for generating media content is provided that includes a storage configured to store instructions and at least one processor configured to execute the instructions and cause the at least one processor to: receive, at a server, first audio data from a first device; send the first audio data to a second device; receive, at the server, first combined audio data, the first combined audio data representing second audio from a second device that is combined with the first audio data; send the first combined audio data to a third device; and receive, at the server, second combined audio data, the second combined audio data representing third audio from the third device that is combined with the first combined audio data.

In another example, a non-transitory computer-readable medium is provided that has stored thereon instructions that, when executed by one or more processors, cause the one or more processors to: receive, at a server, first audio data from a first device; send the first audio data to a second device; receive, at the server, first combined audio data, the first combined audio data representing second audio from a second device that is combined with the first audio data; send the first combined audio data to a third device; and receive, at the server, second combined audio data, the second combined audio data representing third audio from the third device that is combined with the first combined audio data.

In another example, an apparatus for generating media content is provided. The apparatus includes: means for receiving, at a server, first audio data from a first device; means for sending the first audio data to a second device; means for receiving, at the server, first combined audio data, the first combined audio data representing second audio from a second device that is combined with the first audio data; means for sending the first combined audio data to a third device; and means for receiving, at the server, second combined audio data, the second combined audio data representing third audio from the third device that is combined with the first combined audio data.

In some aspects, the method, apparatuses, and computer-readable medium described above can include sending trigger information to a plurality of devices; receiving, at the server from the plurality of devices, a plurality of responses to the trigger information; determining a plurality of latencies associated with the plurality of responses to the trigger information; identifying a first group of devices from the plurality of devices and a second group of devices from the plurality of devices, based at least on the plurality of latencies.

In some aspects, the method, apparatuses, and computer-readable medium described above can include sending trigger information to a plurality of devices; receiving, at the server from the first device, a first response to the trigger information; receiving, at the server from the second device, a second response to the trigger information; receiving, at the server from the third device, a third response to the trigger information; determining that a first latency associated with the first response is less than a second latency associated with the second response; determining that the second latency associated with the second response is less than a third latency associated with the third response; identifying the first device, the second device, and the third device based at least on the first latency, the second latency, and the third latency.

In some aspects, the method, apparatuses, and computer-readable medium described above can include sending background audio data to the first device, wherein the first audio data received from the first device includes the background audio data.

In some aspects, the method, apparatuses, and computer-readable medium described above can include making the second combined audio data available to the first device, the second device, and the third device.

In some aspects, the method, apparatuses, and computer-readable medium described above can include determining that a first latency associated with the first device is less than a second latency associated with the second device; determining that the second latency is less than a third latency associated with the third device; assigning the first device and the second device to a first group based on the first latency and the second latency; assigning the third device to a second group based on the third latency.

In some aspects, the method, apparatuses, and computer-readable medium described above can include sending non-audible tones to a plurality of devices; receiving, at the server from the plurality of devices, audio data that includes the non-audible tones as they were played by speakers at the plurality of devices and recorded using microphones at the plurality of devices; determining a plurality of latencies associated with the plurality of devices based at least on the audio data that includes the non-audible tones as received from the plurality of devices.

In another illustrative example, a method is provided for generating media content. The method includes: receiving, at a third device, first combined audio data, the first combined audio data representing first audio captured at a first device and combined with second audio captured at a second device; capturing third audio data at the third device; generating second combined audio data by combining the first combined audio data with the third audio data; and sending the second combined audio data to a fourth device.

In another example, a system for generating media content is provided that includes a storage configured to store instructions and at least one processor configured to execute the instructions and cause the at least one processor to: receive, at a third device, first combined audio data, the first combined audio data representing first audio captured at a first device and combined with second audio captured at a second device; capture third audio data at the third device; generate second combined audio data by combining the first combined audio data with the third audio data; and send the second combined audio data to a fourth device.

In another example, a non-transitory computer-readable medium is provided that has stored thereon instructions that, when executed by one or more processors, cause the one or more processors to: receive, at a third device, first combined audio data, the first combined audio data representing first audio captured at a first device and combined with second audio captured at a second device; capture third audio data at the third device; generate second combined audio data by combining the first combined audio data with the third audio data; and send the second combined audio data to a fourth device.

In another example, an apparatus for generating media content is provided. The apparatus includes: means for receiving, at a third device, first combined audio data, the first combined audio data representing first audio captured at a first device and combined with second audio captured at a second device; means for capturing third audio data at the third device; means for generating second combined audio data by combining the first combined audio data with the third audio data; and means for sending the second combined audio data to a fourth device.

In some aspects, the method, apparatuses, and computer-readable medium described above can include storing, at the third device, the second combined audio data.

In some aspects, the method, apparatuses, and computer-readable medium described above can include generating audio at the third device using the first combined audio data and a speaker at the third device; and generating the second combined audio data at the third device by using a microphone at the third device to capture the first combined audio data and the third audio data.

In some aspects, the method, apparatuses, and computer-readable medium described above can include generating audio at the third device using the first combined audio data and a speaker at the third device; capturing the third audio data using a microphone at the third device; and generating the second combined audio data at the third device by combining the third audio data with the first combined audio data.

In some aspects, the fourth device is a server.

In some aspects, the method, apparatuses, and computer-readable medium described above can include receiving a non-audible tone; playing the non-audible tone using a speaker at the third device; and capturing the non-audible tone played by the speaker, using a microphone at the third device.

In some aspects, the apparatuses described above can be can be part of a computing device, such as a server computer, a mobile device, a set-top box, a personal computer, a laptop computer, a tablet computer, a television, a virtual reality (VR) device, an augmented reality (AR) device, a mixed reality (MR) device, a wearable device, and/or other device. In some aspects, the apparatus further includes a display for displaying one or more images, notifications, and/or other displayable data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 11 illustrates an example ordering according to latency, in accordance with some examples;

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the application as set forth in the appended claims.

Figure 1:
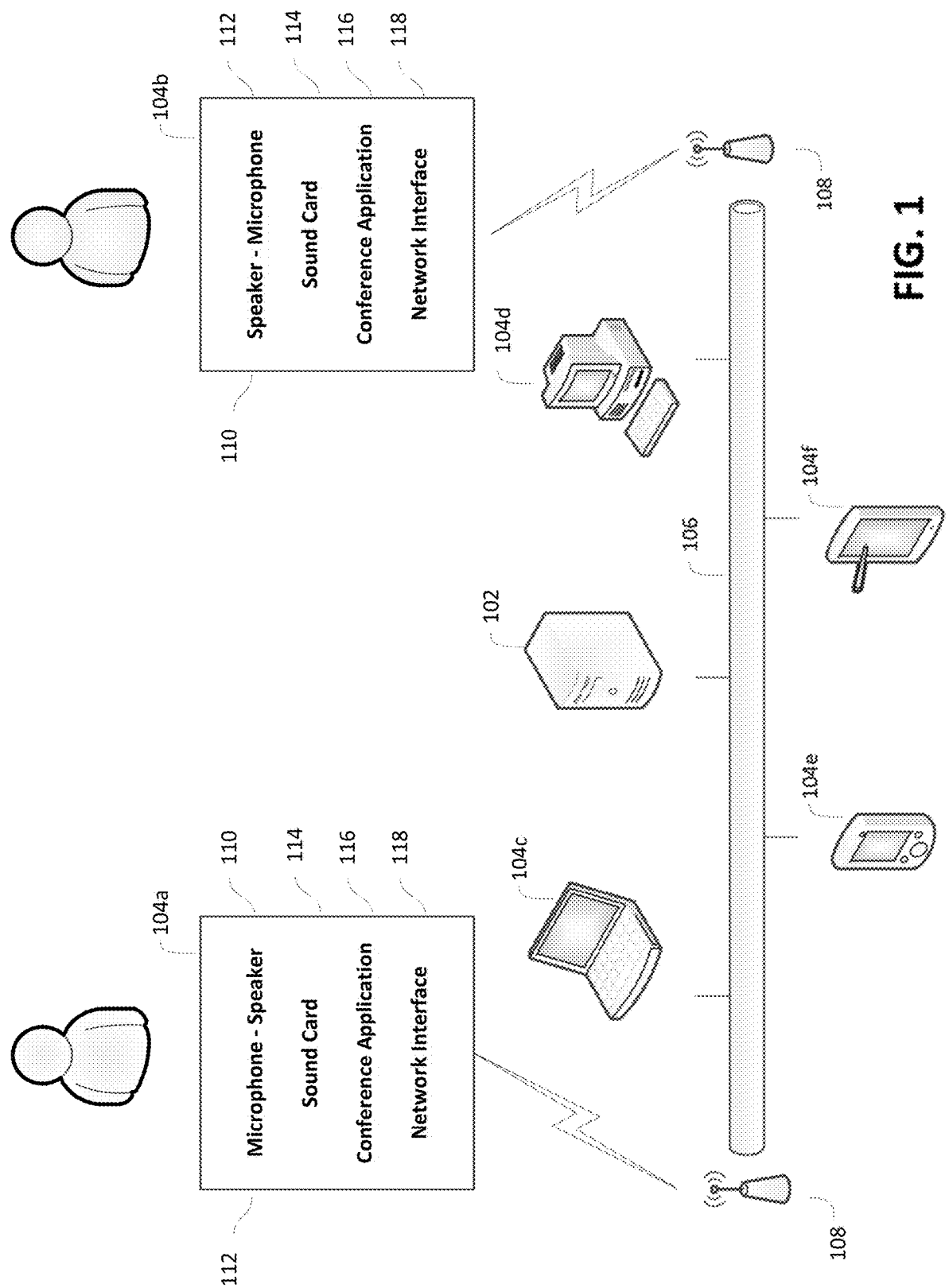
FIG. 1 is a block diagram illustrating an example system for generating media content, in accordance with some examples.

Referring to FIG. 1, system 100 includes at least one server 102, and multiple user client devices 104a-f. Server 102 and user client devices 104 are electronically connected, such as through network 106. Access to network 106 for user client devices 104 typically occurs through a hardwire ethernet connection, or through a wireless access point 108.

System 100 supports electronic conferencing of multiple users, where audio and/or video is distributed in near real-time between the other users. For example, a user of client device 104a has a client version of an electronic conferencing application installed on client device 104a. Similarly, a user of client device 104b has the same client version of the electronic conferencing application installed on client device 104b. Other users of client devices (104c-f) also have the same or similar client version of the electronic conferencing application installed on their respective devices. Server 102 has a server version of the electronic conferencing application. Illustrative examples of electronic conferencing applications that may be installed on the client devices 104a-104f include ZOOM™, Microsoft Teams™, Cisco WebEx™, Bluejeans™, among others.

User client devices 104 include speakers 110, microphones 112, and video capture components. In some examples, the speakers and microphones can be connected to a sound card 114, or similar component to convert digital signals to/from analog signals. Analog signals can be used to generate audio that can be heard from the speakers 110. In a similar manner, voice or other sounds can be captured by microphones 112 as an analog signal. The analog signal may then converted to a digital signal by the sound card 114. The digital signals from the microphones can then be sent to the client version of the electronic conferencing application 116. The client version of the electronic conferencing application can communicate with a network interface 118, allowing the digital signals to be shared (sent/received) with other user client devices 104 across network 106.

When an electronic conference is desired, details of the conference are sent to the individual user client devices 104. The details may include a link to install the electronic conferencing application, if it is not already installed. The details may also include a link to launch the electronic conferencing application, where it is already installed. In some cases, the electronic conferencing application may not require installation of an application, but can operate using a Web interface, where a browser is able to interact with the conferencing application on server 102, such as using a traditional hyper-text markup language (HTML) protocol.

Regardless of how the electronic conferencing application operates on the user client devices 104, at the desired date and time for the electronic conference, the users log into the conference (e.g., by entering a passcode or other login information). After any required preliminary details are addressed (e.g., granting permission for use of camera, microphone, etc.), the conference begins and all of the users are able to interact within the conference. Where there is video sharing, the users may be able to see other users and can be seen by other users. Even where some users do not share video, such users typically share audio.

In most electronic conferencing applications, video may be continuously shared, but audio for individual users may be muted until they speak. The muting can be automatic, or manual. The electronic conferencing application may support simultaneous audio sharing with multiple users, but as the number of users increases, it can be difficult to follow a conversation with multiple speakers. This is particularly difficult where the users are intentionally speaking in synchronization (e.g., when a group of users is singing via a video conference, such as in a chorus). For instance, if all the users are not hearing the same thing at the same time as they sing, and the voices from all the singers are combined, the result can lead to a poor user experience. In addition, some singers may need to be able to hear their own voice along with the other singers, so they can adjust their pitch, and stay synchronized.

In most electronic conferencing applications, a user will not hear their own voice coming back to them through their own speakers. If a user is able to hear their own voice coming back to them, it may appear like an echo. When the latency between when the user speaks and when the user's own audio is output by the user's speaker is fairly long, it can be easier for the user to ignore the echo of their own voice. However, as the latency gets shorter, a user may try to follow their own voice, which can result in the user starting to slow down their singing, and eventually any effort to sing along with others becomes difficult or impossible. Even where an individual user does not hear their own voice coming back to them, it is very difficult for a group of singers to stay in pitch and synchronized in an electronic conference.

System and methods are described herein that perform latency control for electronic conferencing applications. The systems and methods can help a group of speakers (e.g., singers) to stay in pitch and synchronized in an electronic conference. For instance, the systems and methods can perform the latency control by measuring and monitoring the latency of each user. In some instances, the measured and monitored latency is the latency between the server and each user client device. In other instances, the latency is the latency between one user client device and another user client device. The systems and methods can then order or group the users according to the individual latency of each user. The combined audio of the group of users can then be built user by user until the audio or voice of the last user is added. Examples are described herein using singing as an example of synchronized speaking. However, the methods and systems can be applied to any other type of synchronized speaking. The systems and methods are described in further detail below.

Various use case examples will now be described using the systems and techniques described herein.

Figure 2:
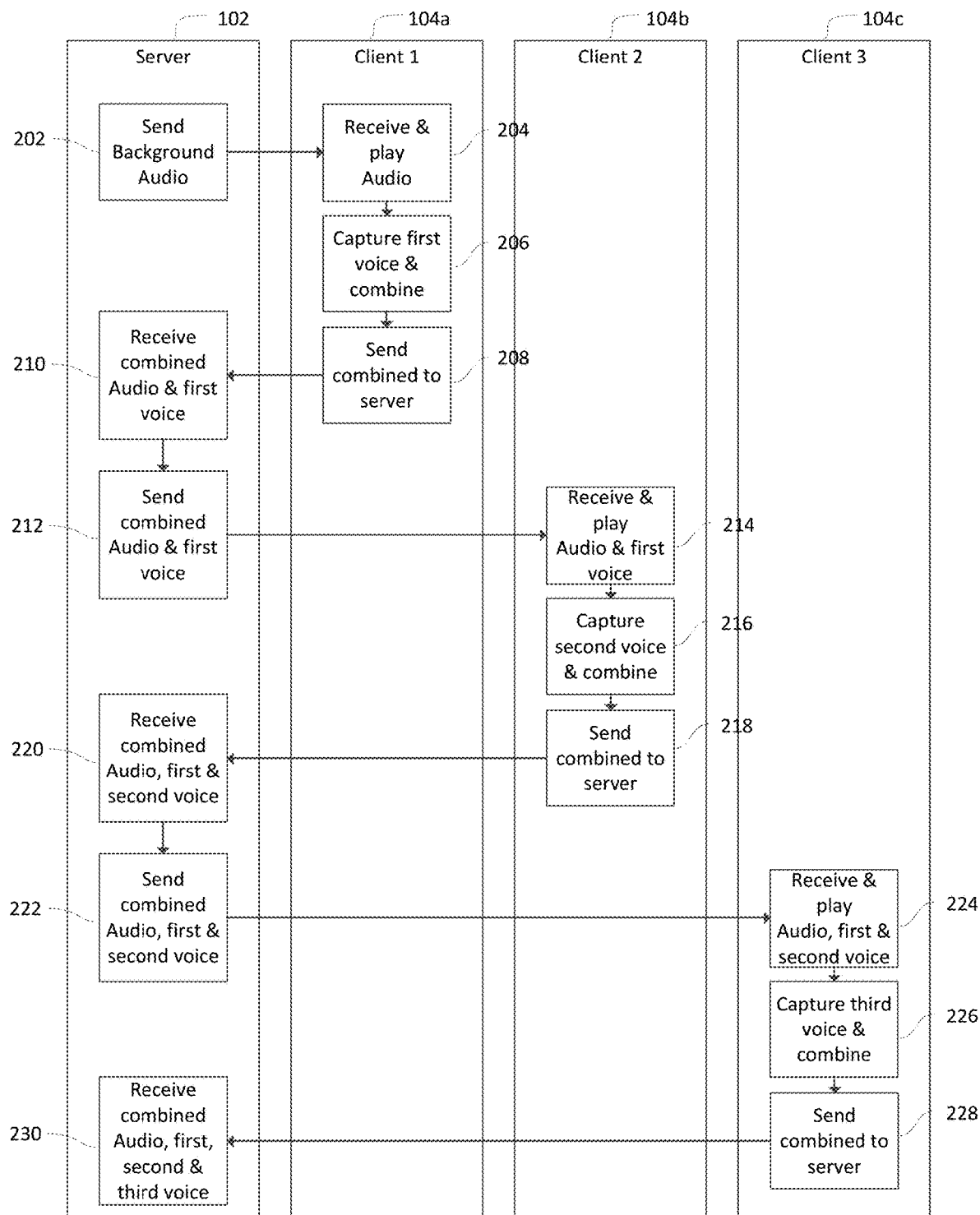
FIG. 2 is a flow diagram illustrating an example of a process for generating media content and performing one or more functions based on generating media content, in accordance with some examples.
Figure 3:
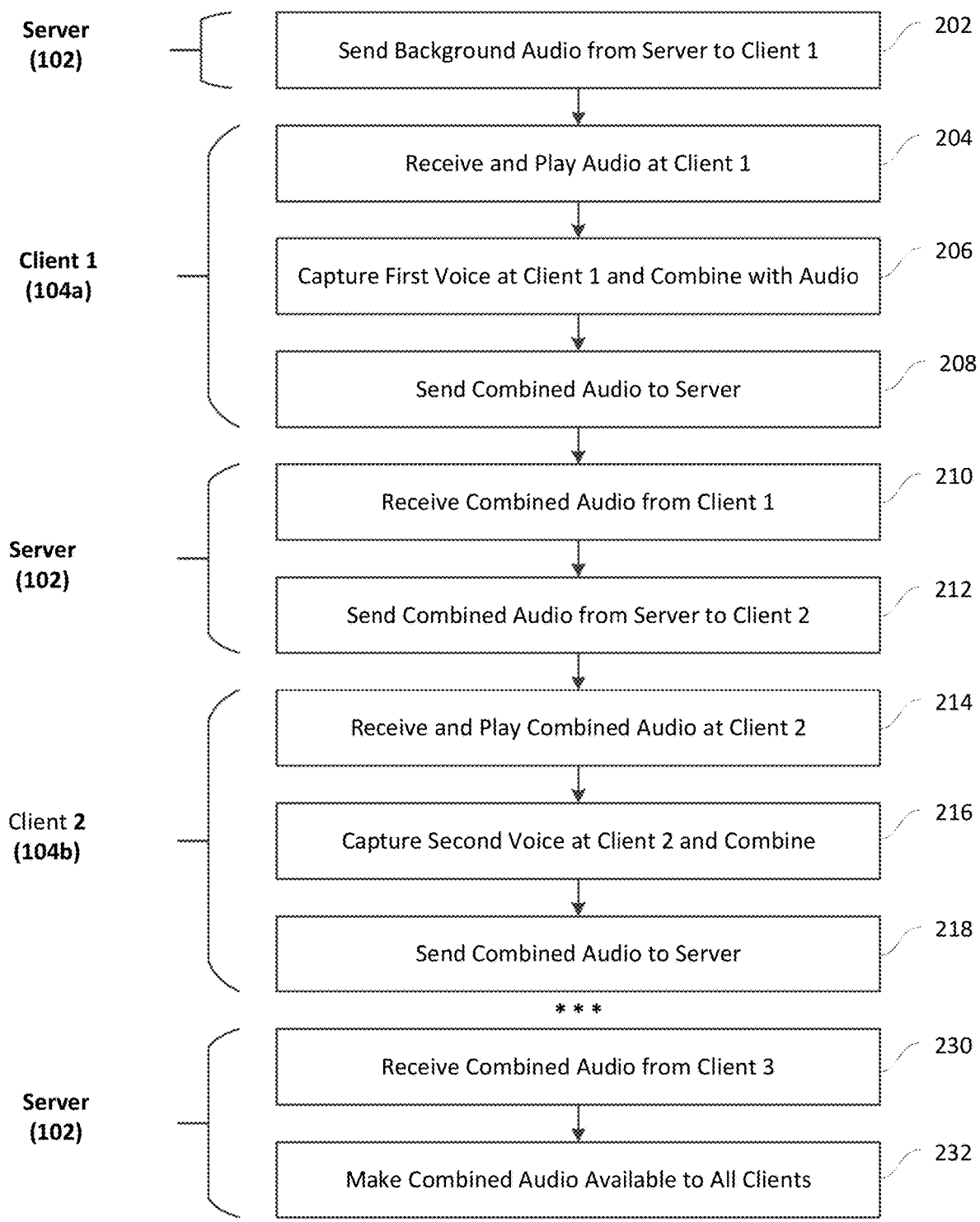
FIG. 3 is a flow diagram illustrating an example of a process for generating media content and performing one or more functions based on generating media content, in accordance with some examples.

One embodiment is illustrated in FIG. 2 and FIG. 3, where at block 202, server 102 begins to send or stream a background audio track that the group of users want to sing along with. That background audio track is sent as background audio data and might have instrumentals, voices or both. Although not illustrated in FIGS. 2 and 3, the background audio data sent by server 102 may be sent as a digital stream from server 102 through network 106 and in some cases through the access point 108. The network interface 118 of user client device 104a receives the digital stream, and passes it to the electronic conferencing application. The electronic conferencing application can then pass the digital stream to the sound card 114, where the digital stream is converted to an analog signal and played by speaker 110.

At block 204, user client device 104a receives the background audio data and begins to play or output that data using speaker 110. At block 206, user client device 104a starts to capture audio using microphone 112. The captured audio is the singing voice of the user of client device 104a. At block 206, the audio captured by microphone 112 is either combined with the analog audio stream and then digitized, or digitized and then combined with the received digital audio stream. The combined audio is then sent at block 208 from user client device 104a back to server 102 as a digital audio stream. Also not illustrated in FIGS. 2 and 3, the combined digital audio stream can be processed by the client version of the electronic conferencing application 116, passed to network interface 118, and sent to server 102 through access point 108 and network 106.

At block 210, server 102 receives the combined audio from user client device 104a. The combined audio includes both the original background audio track sent at block 202, and the voice captured by user client device 104a at block 206. At block 212, server 102 sends the combined audio to user client device 104b. At block 214, user client device 104b receives the combined audio and begins to play that combined audio using speaker 110. At block 216, user client device 104b starts to capture audio using microphone 112. The captured audio is the singing voice of the user of client device 104b. At block 216, the audio captured by microphone 112 is either combined with the analog audio stream and then digitized, or digitized and then combined with the received digital audio stream. The combined audio is then sent at block 218 from user client device 104b back to server 102 as a digital audio stream.

At block 220, server 102 receives the combined audio from user client device 104b. The combined audio received by the server 102 from the user client device 104b includes the original background audio track sent at block 202, the voice captured by user client device 104a at block 206, and the voice captured by user client device 104b at block 216. At block 222, server 102 sends the combined audio to user client device 104c. At block 224, user client device 104c receives the combined audio and begins to play that combined audio using speaker 110. At block 226, user client device 104c starts to capture audio using microphone 112. The captured audio is the singing voice of the user of client device 104c. At block 226, the audio captured by microphone 112 is either combined with the analog audio stream and then digitized, or digitized and then combined with the received digital audio stream. The combined audio is then sent at block 228 from user client device 104c back to server 102 as a digital audio stream. At block 230, the server 102 receives the combined audio.

This process can continue by adding new user client devices in the chain until all of the user client devices are receiving, capturing audio, combining that captured audio with the received stream and sending the combined stream back to the server. Although illustrated as single events in FIGS. 2 and 3, the individual actions can continue so long as the audio is being streamed from server 102, and combined audio is received from user client devices 104. At some point, the song is finished, and at block 232 the final combined audio file can be made available to any of user client devices 104 or other devices where it can be played back. That audio file will have the original background audio track, combined with voices captured by the individual user client devices 104, much as though the users were all located in the same room and singing at the same time.

In the embodiment illustrated in FIGS. 2 and 3, server 102 streams multiple different audio streams. A stream sent from server 102 to user client device 104a at block 202 is the background audio track. Another stream, sent from server 102 to user client device 104b at block 212, has the background audio track combined with the voice captured by user client device 104a at block 206. Another stream, sent from server 102 to user client device 104c at block 222, has the background audio track combined with the voices captured by user client devices 104a and 104b at block 206 and block 216. It can be observed that if a number of users participate, then server 102 will need to maintain that same number of different audio streams, each sent to and received from a different user client device.

Figure 4:
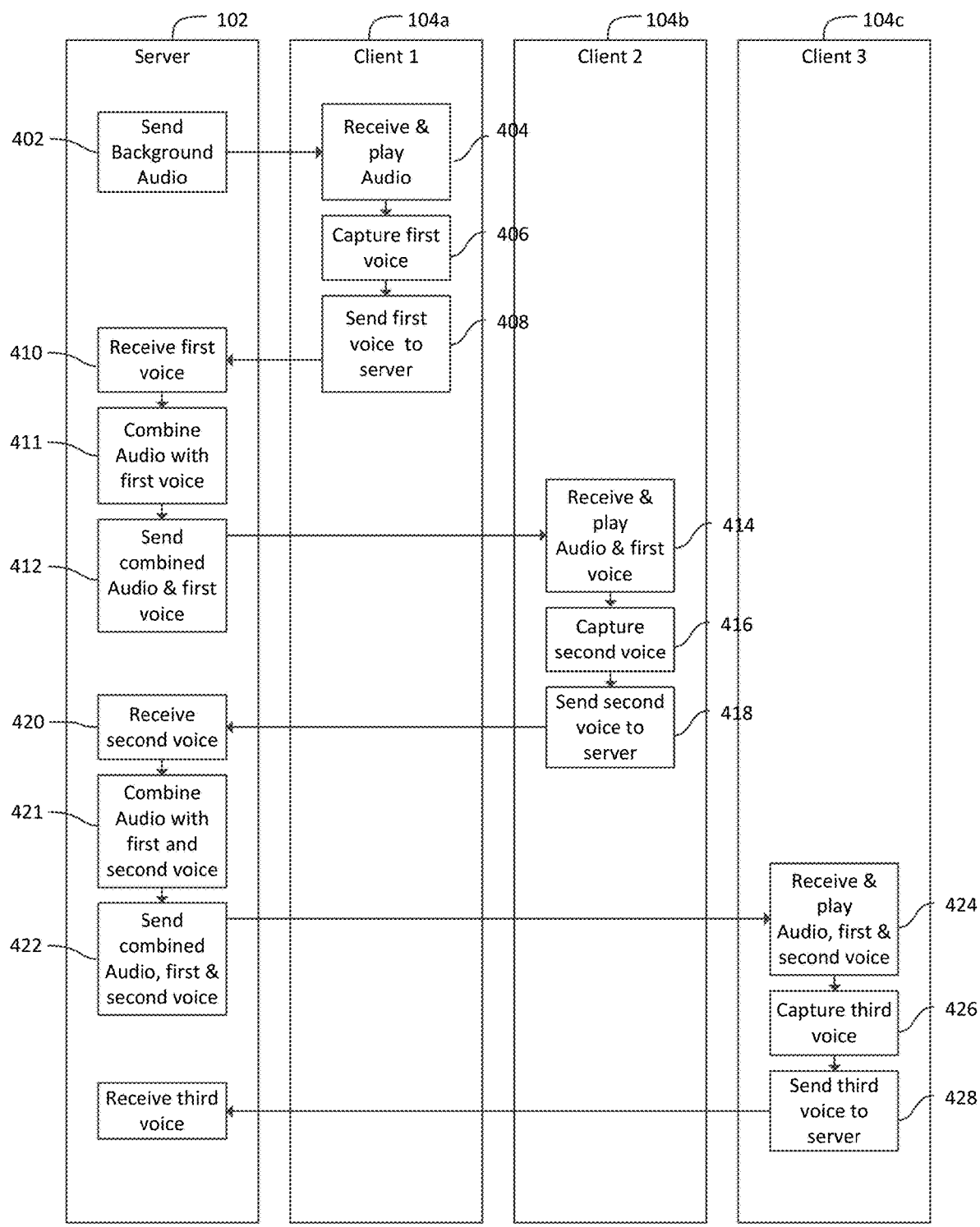
FIG. 4 is a flow diagram illustrating an example of a process for generating media content and performing one or more functions based on generating media content, in accordance with some examples.
Figure 5:
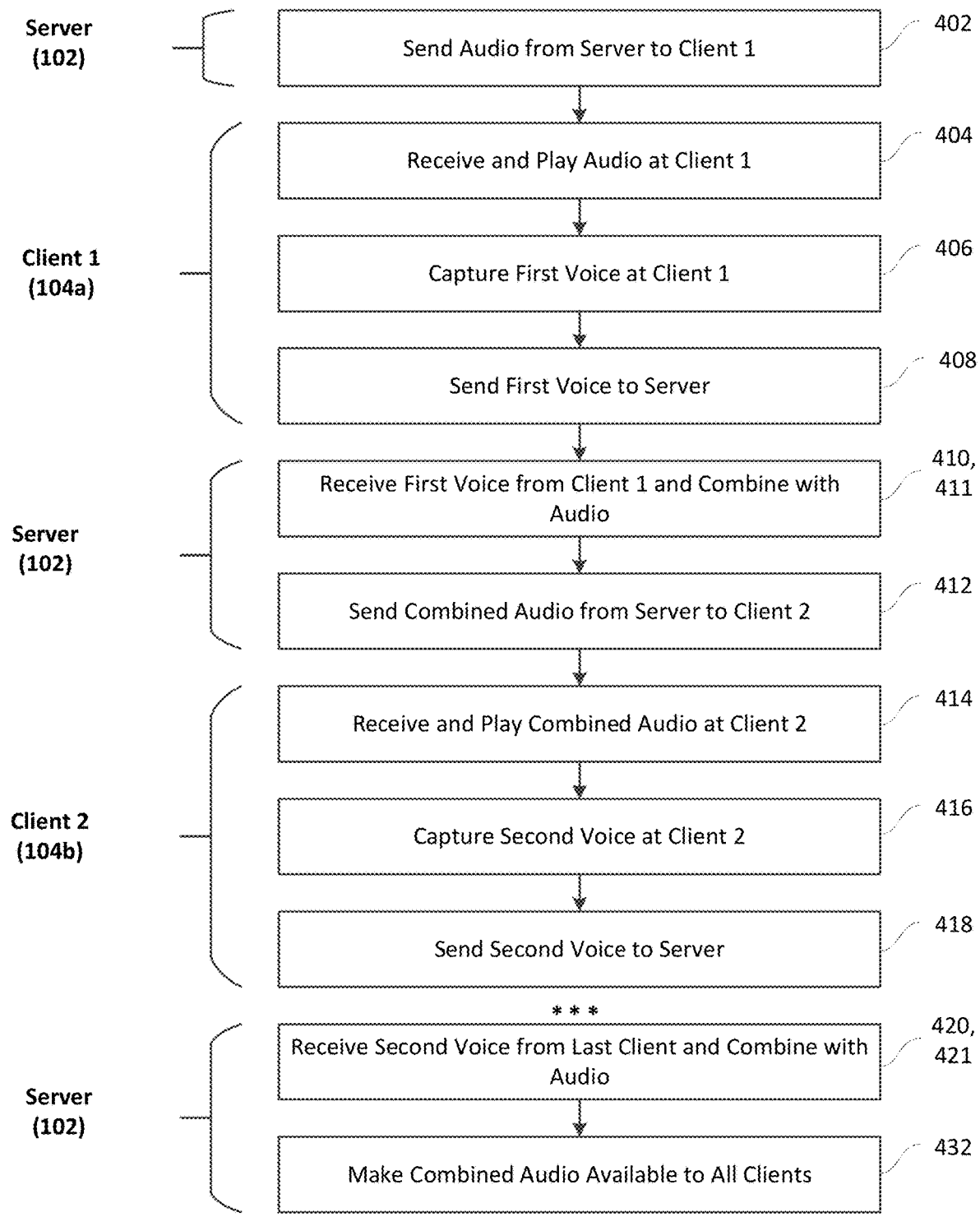
FIG. 5 is a flow diagram illustrating an example of a process for generating media content and performing one or more functions based on generating media content, in accordance with some examples.

A second embodiment is illustrated in FIGS. 4 and 5, where at block 402, server 102 begins to send or stream the background audio track that the group of users want to sing along with. At block 404, user client device 104a receives the background audio data and begins to play that background audio data using speaker 110. At block 406, user client device 104a starts to capture audio using microphone 112. The captured audio is the singing voice of the user of client device 104a. At block 408, the audio captured by microphone 112 is sent from user client device 104a back to server 102 as a digital audio stream.

At block 410, server 102 receives the captured voice from user client device 104a. At block 411, server 102 combines the original background audio track sent at block 402, with the voice captured by user client device 104a at block 406. At block 412, server 102 sends the combined audio to user client device 104b. At block 414, user client device 104b receives the combined audio and begins to play that combined audio using speaker 110. At block 416, user client device 104b starts to capture audio using microphone 112. The captured audio is the singing voice of the user of client device 104b. At block 418, the audio captured by microphone 112 is sent from user client device 104b back to server 102 as a digital audio stream.

At block 420, server 102 receives the captured voice from user client device 104b. At block 421, server 102 combined the original background audio track sent at block 402, with the voice captured by user client device 104a at block 406, and the voice captured by user client device 104b at block

416. At block 422, server 102 sends the combined audio to user client device 104*c*. At block 424, user client device 104*c* receives the combined audio and begins to play that combined audio using speaker 110. At block 426, user client device 104*c* starts to capture audio using microphone 112. The captured audio is the singing voice of the user of client device 104*c*. At block 428, the audio captured by microphone 112 is sent from user client device 104*c* back to server 102 as a digital audio stream.

Like the process illustrated in FIGS. 2 and 3, the process illustrated in FIGS. 4 and 5 can continue by adding new user client devices in the chain until all of the user client devices are receiving, capturing audio, combining that captured audio with the received stream and sending the combined stream back to the server. At some point, the song is finished, and at block 432 the final combined audio file can be made available to any of user client devices 104 or other devices where it can be played back. That audio file will have the original background audio track, combined with voices captured by the individual user client devices 104, much as though the users were all located in the same room and singing at the same time.

Also like the embodiment illustrated in FIGS. 2 and 3, for the embodiment illustrated in FIGS. 4 and 5, server 102 will need to stream multiple different audio streams. One stream, sent from server 102 to user client device 104*a* at block 402 is the background audio track. Another stream, sent from server 102 to user client device 104*b* at block 412 has the background audio track combined with the voice captured by user client device 104*a* at block 406. Another stream, sent from server 102 to user client device 104*c* at block 422 has the background audio track combined with the voices captured by user client devices 104*a* and 104*b* at block 406 and block 416. It can be observed that if a number of users participate, then server 102 will need to maintain that same number of different audio streams, each sent to and received from different user client devices.

A difference between the embodiments of FIGS. 2, 3 and that of FIGS. 4, 5, is that in FIGS. 4 and 5, the individual voice streams captured by the individual user client devices 104 can be maintained at server 102, and then those individual streams can all be combined at the end. This may result in a cleaner final version because any defects that might have been introduced by an individual user client device can be left out of the final version. This could be more difficult to accomplish where each user client device adds it respective audio to a stream and that stream is sent back to the server.

Figure 6:
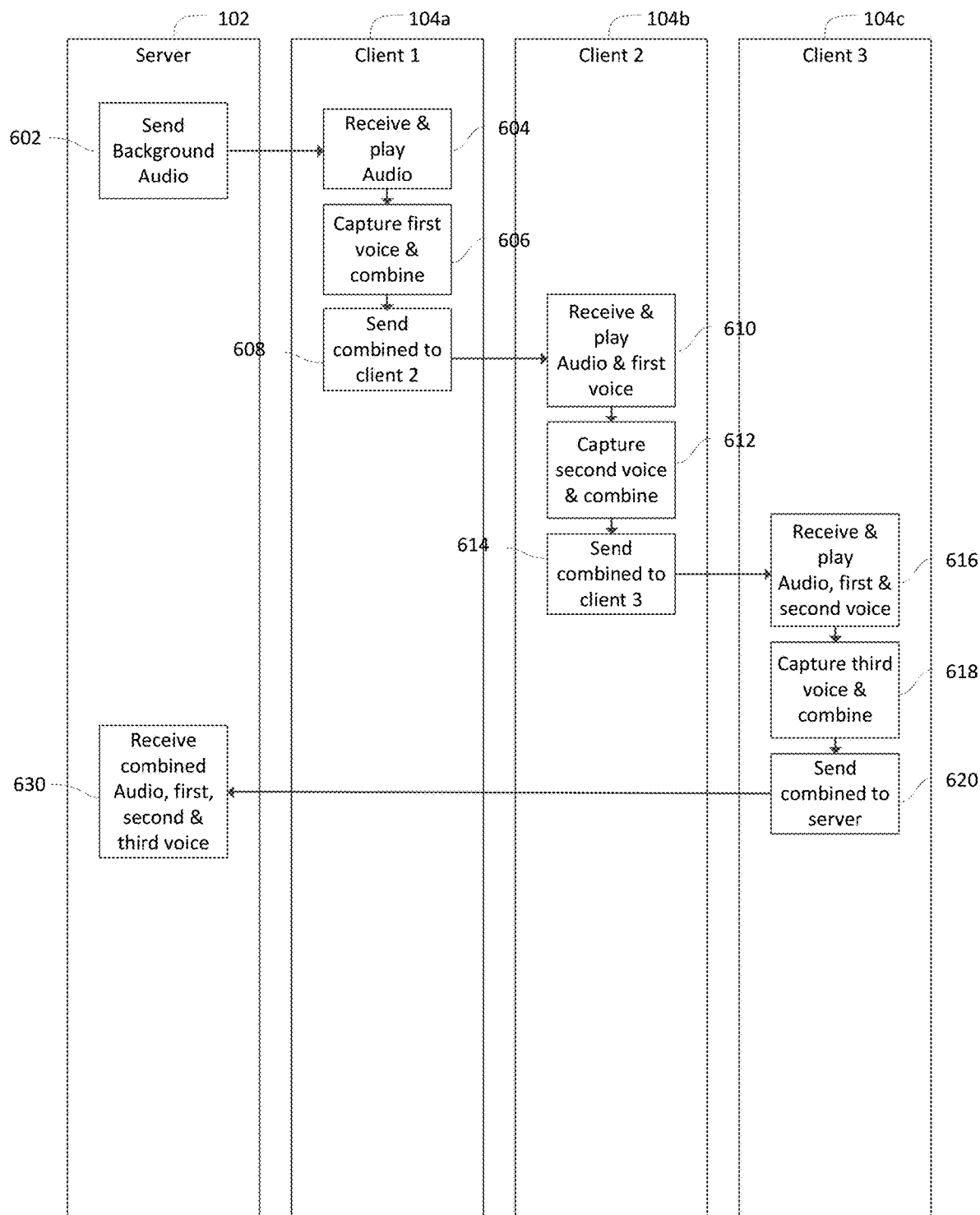
FIG. 6 is a flow diagram illustrating an example of a process for generating media content and performing one or more functions based on generating media content, in accordance with some examples.
Figure 7:
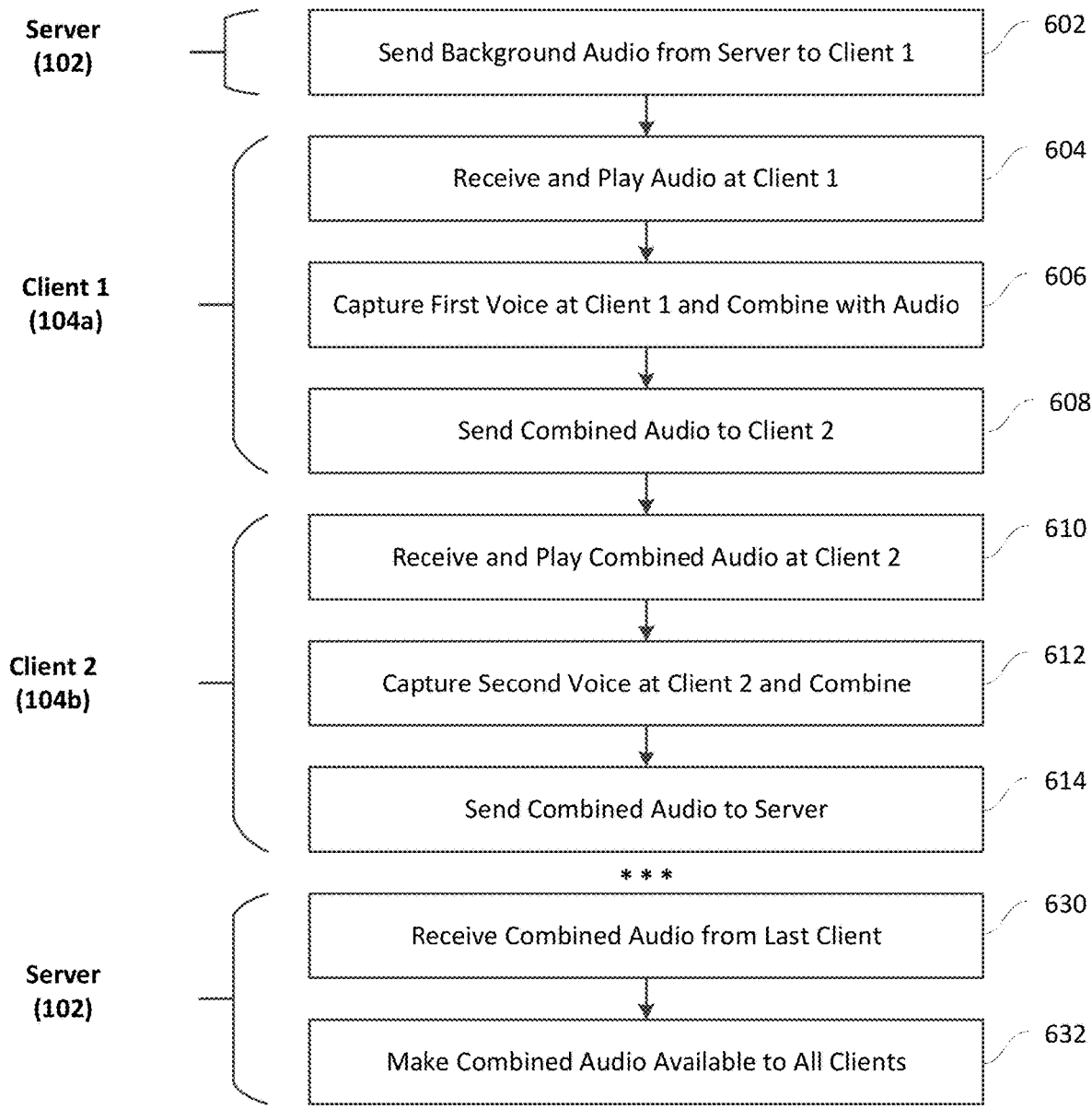
FIG. 7 is a flow diagram illustrating an example of a process for generating media content and performing one or more functions based on generating media content, in accordance with some examples.

A third embodiment is illustrated in FIGS. 6 and 7, where at block 602, server 102 begins to send or stream the background audio data that the group of users want to sing along with. At block 604, user client device 104*a* receives the background audio data and begins to play that background audio data using speaker 110. At block 606, user client device 104*a* starts to capture audio using microphone 112. The captured audio is the singing voice of the user of client device 104*a*. At block 606, the audio captured by microphone 112 is either combined with the analog audio stream and then digitized, or digitized and then combined with the received digital audio stream. The combined audio is then sent at block 608 from user client device 104*a* to user client device 104*b* as a digital audio stream.

At block 610, user client device 104*b* receives the combined audio from user client device 104*a*. The combined audio includes both the original background audio track sent at block 602, and the voice captured by user client device 104*a* at block 606. Also at block 610, user client device 104*b* begins to play that combined audio using speaker 110. At block 612, user client device 104*b* starts to capture audio using microphone 112. The captured audio is the singing voice of the user of client device 104*b*. Also at block 612, the audio captured by microphone 112 is either combined with the analog audio stream and then digitized, or digitized and then combined with the received digital audio stream. The combined audio is then sent at block 614 from user client device 104*b* to user client device 104*c* as a digital audio stream.

At block 616, user client device 104*c* receives the combined audio from user client device 104*b*. The combined audio includes both the original background audio track sent at block 602, the voice captured by user client device 104*a* at block 606 and the voice captured by user client device 104*b* at block 612. Also at block 616, user client device 104*c* begins to play that combined audio using speaker 110. At block 618, user client device 104*c* starts to capture audio using microphone 112. The captured audio is the singing voice of the user of client device 104*c*. Also at block 618, the audio captured by microphone 112 is either combined with the analog audio stream and then digitized, or digitized and then combined with the received digital audio stream. The combined audio is then sent at block 620 from user client device 104*c* to server 102 as a digital audio stream.

Like the process illustrated in FIGS. 2, 3, 4 and 5, the process illustrated in FIGS. 6 and 7 can continue by adding new user client devices in the chain until all of the user devices are receiving, capturing audio, combining that captured audio with the received stream and sending the combined stream to the next user device. At block 630, the server 102 can receive the combined audio file from the last client. At block 632, once the song is finished, the final combined audio file can be made available to any of user client devices 104 or other devices where it can be played back. For instance, one or more of the user client devices 104 server or other devices can download or otherwise access the combined audio file. That audio file will have the original background audio track, combined with voices captured by the individual user client devices 104, much as though the users were all located in the same room and singing at the same time.

Unlike the embodiments illustrated in FIGS. 2, 3, 4 and 5, for the embodiment illustrated in FIGS. 6 and 7, server 102 does not need to stream multiple different audio streams. Instead, server 102 sends one stream to user client device 104*a* at block 602 as just the background audio track. The server does not get the stream until the end. This will significantly reduce the need for server 102 to maintain multiple streams.

Although there is no requirement to arrange the user devices in any particular order, there may be advantages to selecting the order based on latencies of the individual user devices. Where the latency is small for devices, it may be helpful to group the devices such that the user devices with the shortest latency are first in the process, and those user devices with longer latencies join later in the process.

The latencies corresponding to any particular user client device may be different depending on which embodiment above is used. For example, where the server plays a central role in the process, and each user client device receives a stream from the server, and then sends a stream to the server, the latency between the server and the particular user client device may be the most important or relevant latency. If instead, where the server plays only a minor role, and the individual user client devices send and receive the streams between themselves, the latencies between each user client device may be the more important or relevant latency.

Factors that contribute to the latency may include whether the user client device is directly connected to network 106 or connected via access point 108. An access point will introduce some latency as packets are received, re-addressed and then forwarded. Further, the physical distance between two user client devices or between a user client device and the server will have a direct impact on the latency. Although the signals generally travel at close to the speed of light, there is a measurable delay as a signal crosses the continent, or goes from one continent to another continent. If two client devices are located in the same building and connected to the same local area network, we can expect a generally short latency. If the two client devices are on opposite sides of the earth and are connected by terrestrial fiber, we can expect a much longer latency. A satellite link introduces even greater latency. Further the components in the user client device can contribute to the latency. Processing a digital signal to produce an analog signal takes a measurable amount of time. The conferencing application may introduce some latency. If the user client device is running multiple applications in addition to the conferencing application, that can introduce additional latency.

Figure 8:
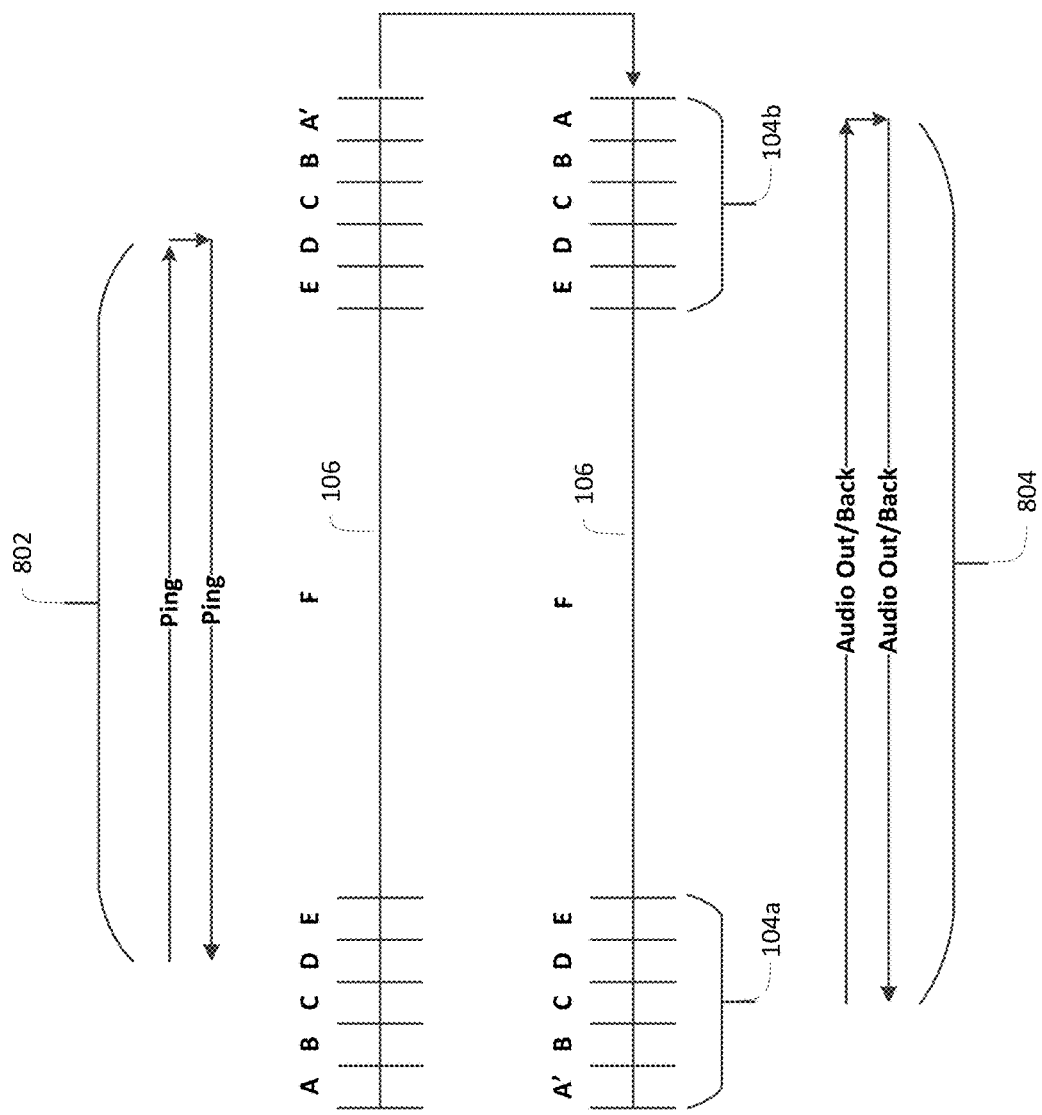
FIG. 8 illustrates examples and various techniques for determining latency.

Measuring and monitoring the relevant latency is important if ordering the users by latency is desired. As illustrated in FIG. 8, there are at least two ways to measure latency between two client devices. In FIG. 8 the two client devices are illustrated as user client device 104a and 104b. The two client devices are connected by network 106. However, one of the client devices could be server 102. One way to measure the latency is through use of a ping 802. In the example, user client device 104a sends a ping to user client device 104b. That ping is automatically responded to by user client device 104b, which sends an automated response back to user client device 104a. The time between sending and receiving the response is determined and provided. The ping acts as a trigger starting the process of determining the latency.

Below is an illustrative example of a ping that can be sent by a device to a web site server that is accessible via the Internet:

H:\>ping 8.8.8.8
Pinging 8.8.8.8 with 32 bytes of data:
Reply from 8.8.8.8: bytes=32 time=50 ms TTL=115
Reply from 8.8.8.8: bytes=32 time=48 ms TTL=115
Reply from 8.8.8.8: bytes=32 time=46 ms TTL=115
Reply from 8.8.8.8: bytes=32 time=48 ms TTL=115
Ping statistics for 8.8.8.8:
    Packets: Sent=4, Received=4, Lost=0 (0% loss),
Approximate round trip times in milli-seconds:
    Minimum=46 ms, Maximum=50 ms, Average=48 ms In the example above, four individual pings or triggers were sent, and the total round-trip time was measured as between 46 ms and 50 ms, with 48 ms being the average.

In another example, a ping to an IP address known to be hosted on the same local area network returns:

H:\>ping 192.168.0.10
Pinging 192.168.0.10 with 32 bytes of data:
Reply from 192.168.0.10: bytes=32 time=2 ms TTL=255
Reply from 192.168.0.10: bytes=32 time=2 ms TTL=255
Reply from 192.168.0.10: bytes=32 time=1 ms TTL=255
Reply from 192.168.0.10: bytes=32 time=3 ms TTL=255
Ping statistics for 192.168.0.10:
    Packets: Sent=4, Received=4, Lost=0 (0% loss),
Approximate round trip times in milli-seconds:
    Minimum=1 ms, Maximum=3 ms, Average=2 ms These ping results represent a much shorter average latency of only 2 ms. To trigger the latency determination, a ping is generated by the operating system of a computer device, so it originates in a device or process that is close to the network. It therefore does not measure any latency that might be associated with microphones, speakers, sound-cards, or conferencing applications that are higher in the protocol stack. In FIG. 8, A and A' represent the time needed for a signal to travel between the microphone/speaker 110/112 and the sound card 114. B represents the time needed for that signal to travel between the sound card 114 and the conferencing application 116. C represents the time needed for that signal to travel between the conferencing application 116 and the network interface 118. D represents the time needed for that signal to travel between the network interface 118 and the access point 108. E represents the time needed for that signal to travel between the access point 108 and the connection to network 106. F represents the time needed for that signal to travel across the network 106. The ping originates by a component or process that is close to the network interface, so it is represented in 802 as originating at D and responding at D. This leaves out all of A, B, and C on each end. So, it is possible that some component or application that is part of user client device 104 introduces additional delay or latency that would not be captured using only a ping command.

A second way to measure the latency and capture more of the signal path is by using an audio signal that is sent from a first client device to a second client device. The audio signal could be audible, or non-audible. A non-audible signal might be just outside the normal hearing range of a person, but within the audio capabilities of the speaker, microphone and sound card. When the second client device receives the audio signal it is played or rendered by the speaker, and that sound is detected by the microphone also at that client device. The signal itself may have some form of time stamp embedded in the signal. The detected signal or timestamp is then sent back to the first client device, where a time delay between sending and receiving can be determined. This is illustrated as 804. In this example, the audio signal is triggered by and generated at C by the conferencing application, and goes all the way to the speaker 110 and is received by the microphone 112. In this way almost the entire latency between client device 104a and 104b can be measured.

Figure 9:
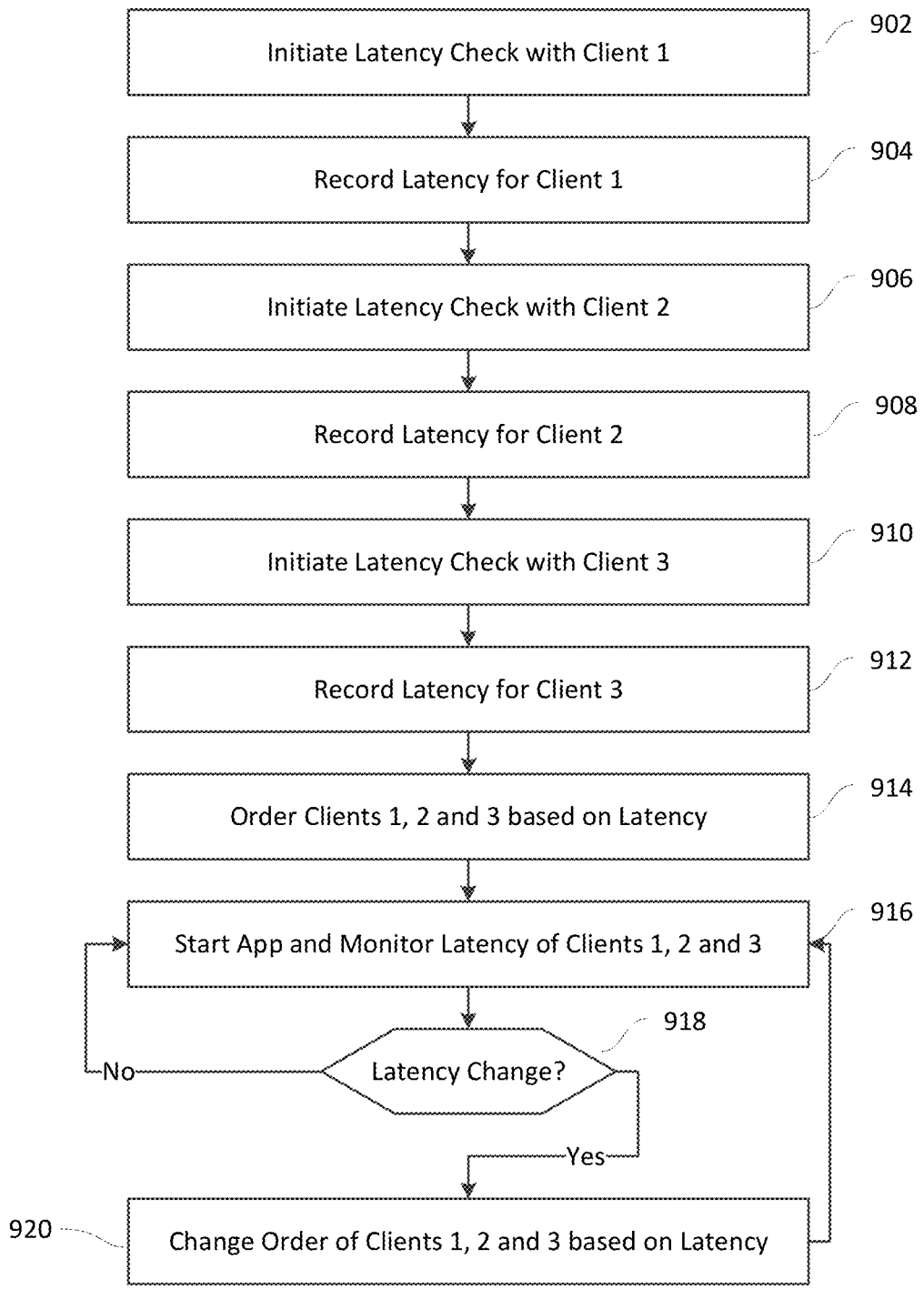
FIG. 9 is a flow diagram illustrating an example of a process for generating media content and performing one or more functions based on generating media content, in accordance with some examples.

Referring to FIG. 9, at block 902 server 102 triggers or initiates a latency check with user client device 104a. The latency corresponding to the round-trip delay between server 102 and user client device 104a is recorded at block 904. At block 906 server 102 triggers or initiates a latency check with user client device 104b. The latency corresponding to the round-trip delay between server 102 and user client device 104b is recorded at block 908. At block 910, server 102 triggers or initiates a latency check with user client device 104c. The latency corresponding to the round-trip delay between server 102 and user client device 104c is recorded at block 912.

At block 914, system 100 orders or arranges the user client devices 104 according to their latencies. At block 916, the conferencing application starts and the latencies of the individual user client devices 104 are monitored. At block 918 system 100 determines whether any of the latencies have changed such that a change in order is warranted. If such a change in order is warranted, that change is implemented at block 920, and the process continues to monitor the latencies.

Figure 10:
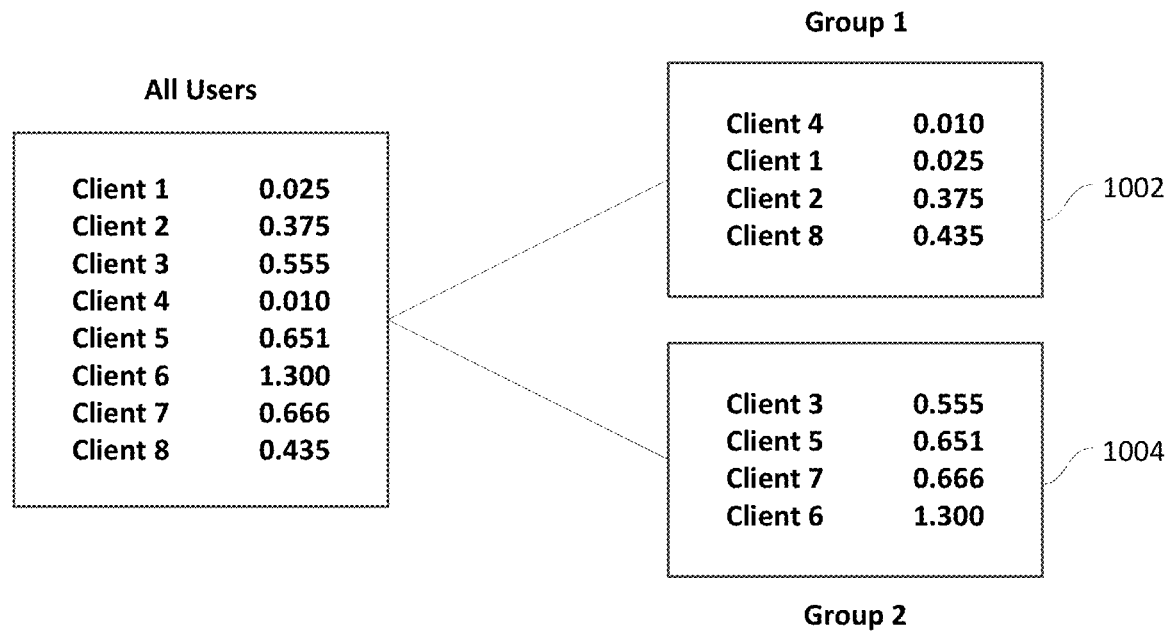
FIG. 10 illustrates example groupings according to latency, in accordance with some examples.
Figure 10:
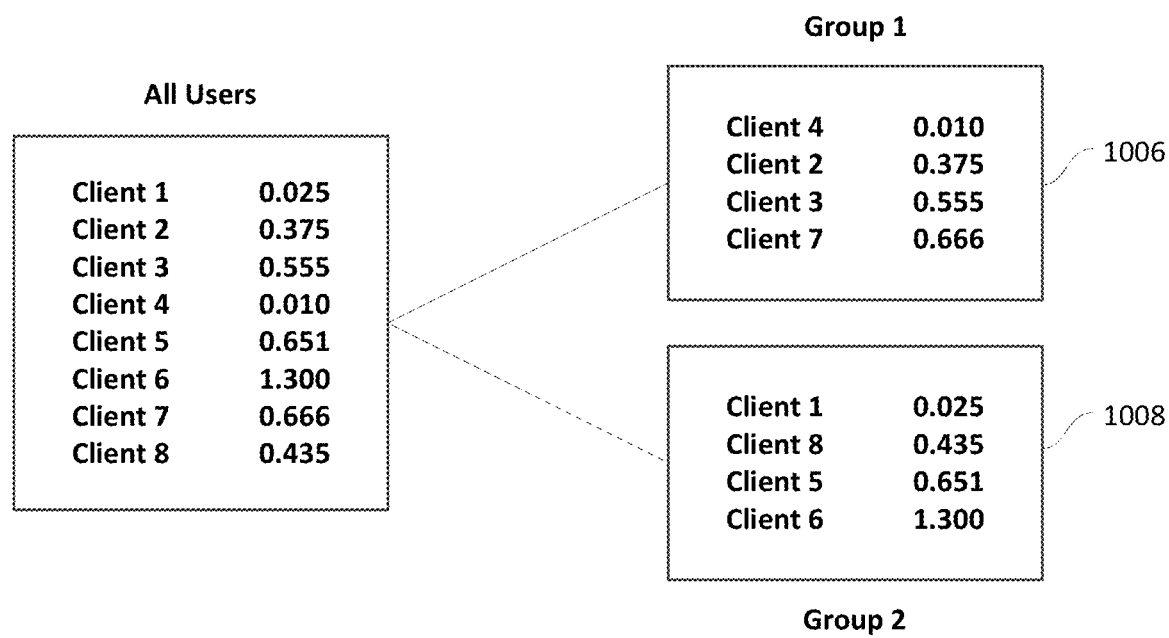

When the number of user client devices that participate in the conference becomes large, or the latencies for user client devices become long, it may be impractical to have all user devices in one group. As illustrated in FIG. 10, there are at least two ways that user client devices might be grouped when it is practical to have more than one group. In a first embodiment, the individual users are grouped according to their latencies. Those with the shortest latencies are in a first group 1002, those with the longer latencies are in a second group 1004.

In a second embodiment, the latencies are distributed among the groups. With both the first group 1006 and second group 1008 having short and long latencies. By limiting the number of user client devices 104 in each group the cumulative latency of all the user client devices in the group can be managed.

Even when the user client devices are not distributed into more than one group, there may be advantages to ordering the user client devices by latency, with the user client device having the shortest latency being added first, and the user client device having the longest latency being added last. This is illustrated in FIG. 11.

Figure 12:
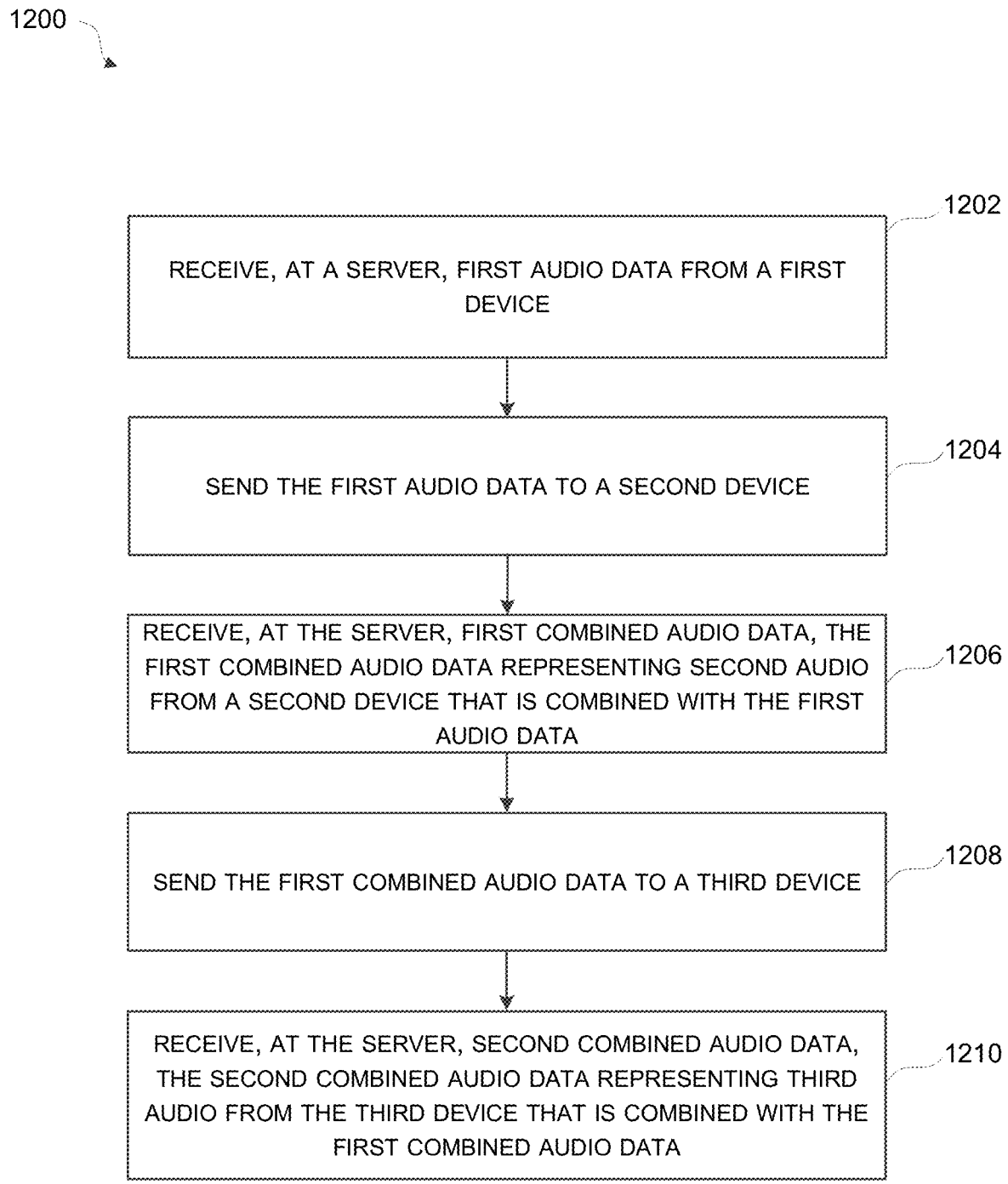
FIG. 12 is a flow diagram illustrating an example process for generating media content and performing one or more functions based on generating media content, in accordance with some examples.

FIG. 12 is a flow diagram illustrating an example of a process 1200 for generating media content and performing one or more functions based on generating media content. At block 1202, the process 1200 includes receiving, at a server, first audio data from a first device. At block 1204, the process 1200 includes sending the first audio data to a second device.

At block 1206, the process 1200 includes receiving, at the server, first combined audio data. The first combined audio data represents second audio from a second device that is combined with the first audio data. At block 1208, the process 1200 includes sending the first combined audio data to a third device. At block 1210, the process 1200 includes receiving, at the server, second combined audio data. The second combined audio data represents third audio from the third device that is combined with the first combined audio data.

In some examples, the process 1200 can include sending trigger information to a plurality of devices and receiving, at the server from the plurality of devices, a plurality of responses to the trigger information. The process 1200 can include determining a plurality of latencies associated with the plurality of responses to the trigger information. The process 1200 can include identifying a first group of devices from the plurality of devices and a second group of devices from the plurality of devices, based at least on the plurality of latencies.

In some examples, the process 1200 can include sending trigger information to a plurality of devices and receiving, at the server from the first device, a first response to the trigger information. The process 1200 can include receiving, at the server from the second device, a second response to the trigger information. The process 1200 can include receiving, at the server from the third device, a third response to the trigger information. The process 1200 can further include determining that a first latency associated with the first response is less than a second latency associated with the second response. The process 1200 can include determining that the second latency associated with the second response is less than a third latency associated with the third response. The process 1200 can include identifying the first device, the second device, and the third device based at least on the first latency, the second latency, and the third latency.

In some cases, the process 1200 can include sending background audio data to the first device. For example, the first audio data received from the first device can include the background audio data. In some examples, the process 1200 can include making the second combined audio data available (e.g., available for download, for streaming, or otherwise available) to the first device, the second device, and the third device.

In some aspects, the process 1200 can include determining that a first latency associated with the first device is less than a second latency associated with the second device. The process 1200 can further include determining that the second latency is less than a third latency associated with the third device. The process 1200 can include assigning the first device and the second device to a first group based on the first latency and the second latency. The process 1200 can further include assigning the third device to a second group based on the third latency.

In some aspects, the process 1200 can include sending non-audible tones to a plurality of devices. The process 1200 can further include receiving, at the server from the plurality of devices, audio data that includes the non-audible tones as they were played by speakers at the plurality of devices and recorded using microphones at the plurality of devices. The process 1200 can include determining a plurality of latencies associated with the plurality of devices based at least on the audio data that includes the non-audible tones as received from the plurality of devices.

Another example process can be performed for generating media content. For example, the process can include receiving, at a third device, first combined audio data. The first combined audio data represents first audio captured at a first device and combined with second audio captured at a second device. The process can include capturing third audio data at the third device. The process can further include generating second combined audio data by combining the first combined audio data with the third audio data. The process can include sending the second combined audio data to a fourth device. In some examples, the fourth device is a server.

In some cases, the process can include storing, at the third device, the second combined audio data.

In some examples, the process can include generating audio at the third device using the first combined audio data and a speaker at the third device. The process can include generating the second combined audio data at the third device by using a microphone at the third device to capture the first combined audio data and the third audio data.

In some cases, the process can include generating audio at the third device using the first combined audio data and a speaker at the third device. The process can include capturing the third audio data using a microphone at the third device. The process can further include generating the second combined audio data at the third device by combining the third audio data with the first combined audio data.

In some aspects, the process can include receiving a non-audible tone. The process can include playing the non-audible tone using a speaker at the third device. The process can further include capturing the non-audible tone played by the speaker, using a microphone at the third device.

The components of the devices and/or servers configured to perform the processes described herein can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes may be described or illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (as illustrated in FIGS. 2-7 and 9) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 13:
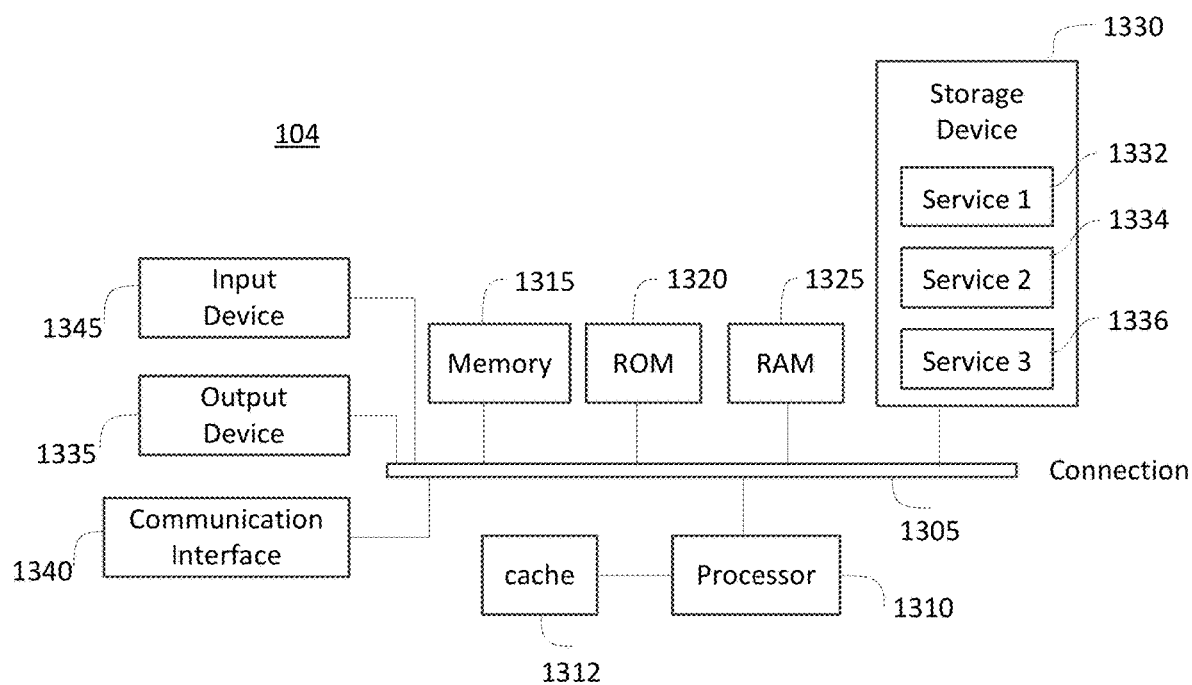
FIG. 13 is a block diagram illustrating an example of a user device, in accordance with some examples.

FIG. 13 is a diagram illustrating an example of a system for implementing certain aspects of the techniques described herein. In particular, FIG. 13 illustrates an example of user client device 104, which can be, for example, any computing device making up internal computing system, a remote computing system, a television, a set-top box, a mobile device, another computing device or system, or any component thereof in which the components of the system are in communication with each other using connection 1305. Connection 1305 can be a physical connection using a bus, or a direct connection into processor 1310, such as in a chipset architecture. Connection 1305 can also be a virtual connection, networked connection, or logical connection.

In some embodiments, user client device 104 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example user client device 104 includes at least one processing unit (CPU or processor) 1310 and connection 1305 that couples various system components including system memory 1315, such as read-only memory (ROM) 1320 and random access memory (RAM) 1325 to processor 1310. User client device 104 can include a cache 1312 of high-speed memory connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, user client device 104 includes an input device 1345, which can represent any number of input mechanisms, such as a microphone for speech, a touch-sensitive screen for gesture or graphical input, keyboard, mouse, motion input, speech, etc. User client device 104 can also include output device 1335, which can be one or more of a number of output mechanisms, including speakers. In some instances, multimodal systems can enable a user to provide multiple types of input/output to communicate with user client device 104. User client device 104 can include communications interface 1340, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based Bei-Dou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1330 can include software services, servers, services, etc., that when the code that defines such software is executed by the processor 1310, it causes the system to perform a function. In some embodiments, a hardware service that performs a particular function can include the software component stored in a computer-readable medium in connection with the necessary hardware components, such as processor 1310, connection 1305, output device 1335, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method of generating media content, the method comprising: receiving, at a server, first audio data from a first device; sending the first audio data to a second device; receiving, at the server, first combined audio data, the first combined audio data representing second audio from a second device that is combined with the first audio data; sending the first combined audio data to a third device; and receiving, at the server, second combined audio data, the second combined audio data representing third audio from the third device that is combined with the first combined audio data.

Aspect 2: The method according to Aspect 1, further comprising: sending trigger information to a plurality of devices; receiving, at the server from the plurality of devices, a plurality of responses to the trigger information; determining a plurality of latencies associated with the plurality of responses to the trigger information; and identifying a first group of devices from the plurality of devices and a second group of devices from the plurality of devices, based at least on the plurality of latencies.

Aspect 3: The method according to any of Aspects 1 to 2, further comprising: sending trigger information to a plurality of devices; receiving, at the server from the first device, a first response to the trigger information; receiving, at the server from the second device, a second response to the trigger information; receiving, at the server from the third device, a third response to the trigger information; determining that a first latency associated with the first response is less than a second latency associated with the second response; determining that the second latency associated with the second response is less than a third latency associated with the third response; and identifying the first device, the second device, and the third device based at least on the first latency, the second latency, and the third latency.

Aspect 4: The method according to any of Aspects 1 to 3, further comprising sending background audio data to the first device, wherein the first audio data received from the first device includes the background audio data.

Aspect 5: The method according to any of Aspects 1 to 4, further comprising making the second combined audio data available to the first device, the second device, and the third device.

Aspect 6: The method according to any of Aspects 1 to 5, further comprising: determining that a first latency associated with the first device is less than a second latency associated with the second device; determining that the second latency is less than a third latency associated with the third device; assigning the first device and the second device to a first group based on the first latency and the second latency; and assigning the third device to a second group based on the third latency.

Aspect 7: The method according to any of Aspects 1 to 6, further comprising: sending non-audible tones to a plurality of devices; receiving, at the server from the plurality of devices, audio data that includes the non-audible tones as they were played by speakers at the plurality of devices and recorded using microphones at the plurality of devices; and determining a plurality of latencies associated with the plurality of devices based at least on the audio data that includes the non-audible tones as received from the plurality of devices.

Aspect 8: A system for generating media content, the system comprising: a storage configured to store instructions; and at least one processor configured to execute the instructions and cause the at least one processor to: receive first audio data from a first device; send the first audio data to a second device; receive first combined audio data, the first combined audio data representing second audio from a second device that is combined with the first audio data; send the first combined audio data to a third device; and receive second combined audio data, the second combined audio data representing third audio from the third device that is combined with the first combined audio data.

Aspect 9: The system according to Aspect 8, wherein the at least one processor is further configured to execute the instructions and cause the at least one processor to: send trigger information to a plurality of devices; receive from the plurality of devices, a plurality of responses to the trigger information; determine a plurality of latencies associated with the plurality of responses to the trigger information; and identify a first group of devices from the plurality of devices and a second group of devices from the plurality of devices, based at least on the plurality of latencies.

Aspect 10: The system according to any of Aspects 8 to 9, wherein the at least one processor is further configured to execute the instructions and cause the at least one processor to: send trigger information to a plurality of devices; receive from the first device, a first response to the trigger information; receive from the second device, a second response to the trigger information; receive from the third device, a third response to the trigger information; determine that a first latency associated with the first response it less than a second latency associated with the second response; determine that the second latency associated with the second response is less than a third latency associated with the third response; and identify the first device, the second device, and the third device based at least on the first latency, the second latency, and the third latency.

Aspect 11: The system according to any of Aspects 8 to 10, wherein the at least one processor is further configured to execute the instructions and cause the at least one processor to send background audio data to the first device, wherein the first audio data received from the first device includes the background audio data.

Aspect 12: The system according to any of Aspects 8 to 11, wherein the at least one processor is further configured to execute the instructions and cause the at least one processor to make the second combined audio data available to the first device, the second device, and the third device.

Aspect 13: The system according to any of Aspects 8 to 12, wherein the at least one processor is further configured to execute the instructions and cause the at least one processor to: determine that a first latency associated with the first device is less than a second latency associated with the second device; determine that the second latency is less than a third latency associated with the third device; assign the first device and the second device to a first group based on the first latency and the second latency; and assign the third device to a second group based on the third latency.

Aspect 14: The system according to any of Aspects 8 to 13, wherein the at least one processor is further configured to execute the instructions and cause the at least one processor to: send non-audible tones to a plurality of devices; receive from the plurality of devices, audio data that includes the non-audible tones as they were played by speakers at the plurality of devices and recorded using microphones at the plurality of devices; and determine a plurality of latencies associated with the plurality of devices based at least on the audio data that includes the non-audible tones as received from the plurality of devices.

Aspect 15: A method of generating media content, the method comprising: receiving, at a third device, first combined audio data, the first combined audio data representing first audio captured at a first device and combined with second audio captured at a second device; capturing third audio data at the third device; generating second combined audio data by combining the first combined audio data with the third audio data; and sending the second combined audio data to a fourth device.

Aspect 16: The method according to Aspect 15, further comprising storing, at the third device, the second combined audio data.

Aspect 17: The method according to any of Aspects 15 to 16, further comprising: generating audio at the third device using the first combined audio data and a speaker at the third device; and generating the second combined audio data at the third device by using a microphone at the third device to capture the first combined audio data and the third audio data.

Aspect 18: The method according to any of Aspects 15 to 17, further comprising: generating audio at the third device using the first combined audio data and a speaker at the third device; capturing the third audio data using a microphone at the third device; and generating the second combined audio data at the third device by combining the third audio data with the first combined audio data.

Aspect 19: The method according to any of Aspects 15 to 18, wherein the fourth device is a server.

Aspect 20: The method according to any of Aspects 15 to 19, further comprising: receiving a non-audible tone; playing the non-audible tone using a speaker at the third device; and capturing the non-audible tone played by the speaker, using a microphone at the third device.

Aspect 21: A non-transitory computer-readable medium is provided that has stored thereon instructions that, when executed by one or more processors, cause the one or more processors to perform operations according to any of Aspects 1 to 20.

Aspect 22: An apparatus for generating media content is provided, comprising one or more means for performing operations according to any of Aspects 1 to 20.

What is claimed is:

1. A method of generating media content, the method comprising:
    sending a first audio signal to a first device, wherein the first audio signal comprises a first non-audible tone that is outside a normal hearing range of a person and wherein the first audio signal encodes a first time stamp;
    sending a second audio signal to a second device, wherein the second audio signal comprises a second non-audible tone that is outside the normal hearing range of the person and wherein the second audio signal encodes a second time stamp;
    sending a third audio signal to a third device, wherein the third audio signal comprises a third non-audible tone that is outside the normal hearing range of the person and wherein the third audio signal encodes a third time stamp;
    receiving, at a server from the first device, first audio data that comprises the first non-audible tone as played by a speaker of the first device and recorded by a microphone of the first device;
    receiving, at the server from the second device, second audio data that comprises the second non-audible tone as played by a speaker of the second device and recorded by a microphone of the second device;
    receiving, at the server from the third device, third audio data that comprises the third non-audible tone as played by a speaker of the third device and recorded by a microphone of the third device;
    determining a first latency associated with the first device based on the first audio data as received from the first device, wherein the first audio data encodes the first time stamp;
    determining a second latency associated with the second device based on the second audio data as received from the second device, wherein the second audio data encodes the second time stamp;
    determining a third latency associated with the third device based on the third audio data as received from the third device, wherein the third audio data encodes the third time stamp;
    determining an order of the first device, the second device, and the third device based on the first latency, the second latency, and the third latency;
    receiving, at the server, first audio data from the first device;
    sending the first audio data to the second device based on the order;
    receiving, at the server, first combined audio data, the first combined audio data representing second audio from a second device that is combined with the first audio data;
    sending the first combined audio data to the third device based on the order; and
    receiving, at the server, second combined audio data, the second combined audio data representing third audio from the third device that is combined with the first combined audio data.

2. The method according to claim 1, further comprising sending background audio data to the first device based on the order, wherein the first audio data received from the first device includes the background audio data.

3. The method according to claim 1, further comprising making the second combined audio data available to the first device, the second device, and the third device.

4. The method according to claim 1, further comprising:
    determining that the first latency is less than the second latency;
    determining that the second latency is less than the third latency;
    assigning the first device and the second device to a first group based on the first latency and the second latency; and
    assigning the third device to a second group based on the third latency.

5. A system for generating media content, the system comprising:
    a storage configured to store instructions; and
    at least one processor configured to execute the instructions and cause the at least one processor to:
        send a first audio signal to a first device, wherein the first audio signal comprises a first non-audible tone that is outside a normal hearing range of a person and wherein the first audio signal encodes a first time stamp;
        send a second audio signal to a second device, wherein the second audio signal comprises a second non-audible tone that is outside the normal hearing range of the person and wherein the second audio signal encodes a second time stamp;
        send a third audio signal to a third device, wherein the third audio signal comprises a third non-audible tone that is outside the normal hearing range of the person and wherein the third audio signal encodes a third time stamp;
        receive, from the first device, first audio data that comprises the first non-audible tone as played by a speaker of the first device and recorded by a microphone of the first device;
        receive, from the second device, second audio data that comprises the second non-audible tone as played by a speaker of the second device and recorded by a microphone of the second device;
        receive, from the third device, third audio data that comprises the third non-audible tone as played by a speaker of the third device and recorded by a microphone of the third device;
        determine a first latency associated with the first device based on the first audio data as received from the first device, wherein the first audio data encodes the first time stamp;
        determine a second latency associated with the second device based on the second audio data as received from the second device, wherein the second audio data encodes the second time stamp;
        determine a third latency associated with the third device based on the third audio data as received from the third device, wherein the third audio data encodes the third time stamp;

determine an order of the first device, the second device, and the third device based on the first latency, the second latency, and the third latency;
receive first audio data from the first device;
send the first audio data to the second device based on the order;
receive first combined audio data, the first combined audio data representing second audio from a second device that is combined with the first audio data;
send the first combined audio data to the third device based on the order; and
receive second combined audio data, the second combined audio data representing third audio from the third device that is combined with the first combined audio data.

6. The system according to claim 5, wherein the at least one processor is further configured to execute the instructions and cause the at least one processor to send background audio data to the first device based on the order, wherein the first audio data received from the first device includes the background audio data.

7. The system according to claim 5, wherein the at least one processor is further configured to execute the instructions and cause the at least one processor to make the second combined audio data available to the first device, the second device, and the third device.

8. The system according to claim 5, wherein the at least one processor is further configured to execute the instructions and cause the at least one processor to:
determine that the first latency;
determine that the second latency is less than the third latency;
assign the first device and the second device to a first group based on the first latency and the second latency; and
assign the third device to a second group based on the third latency.

9. The method of claim 1, wherein the first non-audible tone is the same as the second non-audible tone and the third non-audible tone.

10. The method of claim 1, wherein the first audio signal, the second audio signal, and the third audio signal are sent at the same time and wherein the first time stamp, the second time stamp, and the third time stamp are the same.

11. The system of claim 5, wherein the first non-audible tone is the same as the second non-audible tone and the third non-audible tone.

12. The system of claim 5, wherein the first audio signal, the second audio signal, and the third audio signal are sent at the same time and wherein the first time stamp, the second time stamp, and the third time stamp are the same.

13. A non-transitory computer-readable storage medium having stored thereon instructions that, when executed by at least one processor, cause the at least one processor to:
cause a communication interface to send a first audio signal to a first device, wherein the first audio signal comprises a first non-audible tone that is outside a normal hearing range of a person and wherein the first audio signal encodes a first time stamp;
cause the communication interface to send a second audio signal to a second device, wherein the second audio signal comprises a second non-audible tone that is outside the normal hearing range of the person and wherein the second audio signal encodes a second time stamp;
cause the communication interface to send a third audio signal to a third device, wherein the third audio signal comprises a third non-audible tone that is outside the normal hearing range of the person and wherein the third audio signal encodes a third time stamp;
receive, via the communication interface from the first device, first audio data that comprises the first non-audible tone as played by a speaker of the first device and recorded by a microphone of the first device;
receive, via the communication interface from the second device, second audio data that comprises the second non-audible tone as played by a speaker of the second device and recorded by a microphone of the second device;
receive, via the communication interface from the third device, third audio data that comprises the third non-audible tone as played by a speaker of the third device and recorded by a microphone of the third device;
determine a first latency associated with the first device based on the first audio data as received from the first device, wherein the first audio data encodes the first time stamp;
determine a second latency associated with the second device based on the second audio data as received from the second device, wherein the second audio data encodes the second time stamp;
determine a third latency associated with the third device based on the third audio data as received from the third device, wherein the third audio data encodes the third time stamp;
determine an order of the first device, the second device, and the third device based on the first latency, the second latency, and the third latency;
receive, via the communication interface, first audio data from the first device;
cause the communication interface to send the first audio data to the second device based on the order;
receive, via the communication interface, first combined audio data, the first combined audio data representing second audio from a second device that is combined with the first audio data;
cause the communication interface to send the first combined audio data to the third device based on the order; and
receive, via the communication interface, second combined audio data, the second combined audio data representing third audio from the third device that is combined with the first combined audio data.

14. The non-transitory computer-readable storage medium of claim 13, wherein the instructions that, when executed by at least one processor, cause the at least one processor to cause the communication interface to send background audio data to the first device based on the order, wherein the first audio data received from the first device includes the background audio data.

15. The non-transitory computer-readable storage medium of claim 13, wherein the instructions that, when executed by at least one processor, cause the at least one processor to make the second combined audio data available to the first device, the second device, and the third device via the communication interface.

16. The non-transitory computer-readable storage medium of claim 13, wherein the instructions that, when executed by at least one processor, cause the at least one processor to:
determine that the first latency;
determine that the second latency is less than the third latency;

assign the first device and the second device to a first group based on the first latency and the second latency; and assign the third device to a second group based on the third latency.

17. The non-transitory computer-readable storage medium of claim 13, wherein the first non-audible tone is the same as the second non-audible tone and the third non-audible tone.

18. The non-transitory computer-readable storage medium of claim 13, wherein the first audio signal, the second audio signal, and the third audio signal are sent at the same time and wherein the first time stamp, the second time stamp, and the third time stamp are the same.

\* \* \* \* \*